Sept. 2, 1924.                          1,507,540
B. WILLIAMS
CLUTCH PEDAL LATCH
Filed May 9, 1923

Inventor
B. Williams
Lacey & Lacey, Attorneys

Patented Sept. 2, 1924.

1,507,540

UNITED STATES PATENT OFFICE.

BURL WILLIAMS, OF BEATRICE, NEBRASKA.

CLUTCH-PEDAL LATCH.

Application filed May 9, 1923. Serial No. 637,809.

*To all whom it may concern:*

Be it known that I, BURL WILLIAMS, a citizen of the United States, residing at Beatrice, in the county of Gage and State of Nebraska, have invented certain new and useful Improvements in Clutch-Pedal Latches, of which the following is a specification.

This invention relates to an improved clutch pedal latch for Ford vehicles and seeks, among other objects, to provide a simple and efficient device for locking the clutch pedal of such a vehicle when rocked forwardly so that the pedal may be secured in neutral position or may be secured in position rendering the low speed of the vehicle transmission active.

The invention has as a further object to provide a device of this character embodying a latch pawl and rack plate, wherein the pawl will be normally held out of engagement with said plate by a spring and wherein a foot rod will be so arranged as to be easily engageable by the foot for depressing the pawl into engagement with the plate.

And the invention has as a still further object to provide a device which may be readily applied to a Ford vehicle without the necessity for any structural change therein.

Other and incidental objects will appear hereinafter.

Referring now more particularly to the drawings, I have, for convenience, shown my improved latch in connection with the clutch pedal 10 of the transmission of a Ford vehicle. The engine is indicated at 11 and, as is well known, the engine is supported at its rear end by bracket arms secured to the crank case of the engine at opposite sides thereof, one of said arms being indicated at 12. At their upper ends, these arms are provided with laterally directed portions 13 which overhang the side bars of the vehicle chassis and are bent to define upstanding reinforcing ribs 14.

Figure 1:
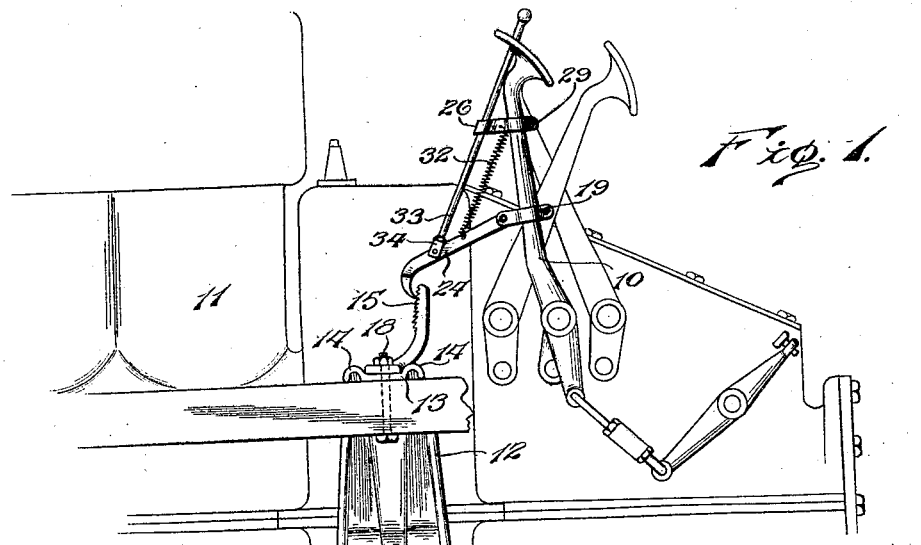
Figure 1 is a fragmentary side elevation showing my improved device applied.
Figure 2:
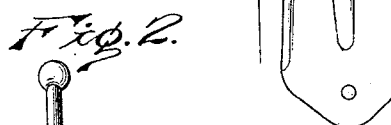
Figure 2 is a front detail elevation of the device.
Figure 3:
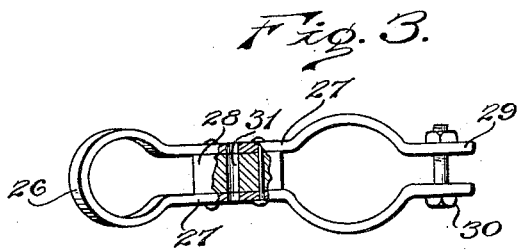
Figure 3 is a detail plan view of the guide clamp of the device.
Figure 4:
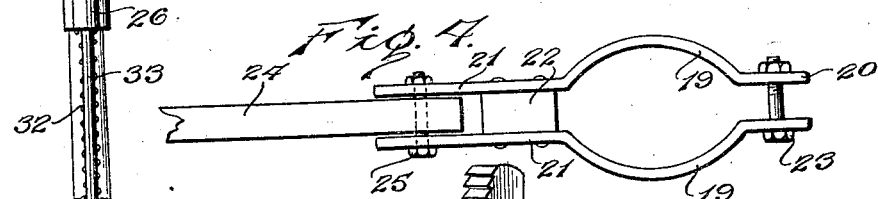
Figure 4 is a detail plan view of the pawl supporting clamp of the device.
Figure 5:
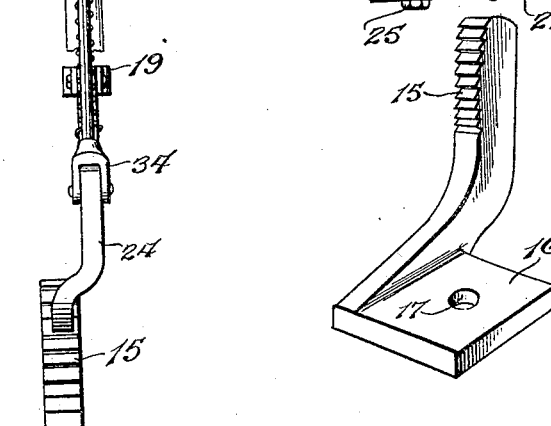
Figure 5 is a detail perspective view of the rack plate.

Coming now more particularly to the subject of the present invention, I employ a rack bar or arm 15 provided at its lower end with a laterally directed base plate 16 which, as shown in Figure 1, is shaped to snugly fit between the ribs 14 of the laterally directed portion 13 of the arm 12 braced by said ribs supporting the rack bar to upstand in vertical position at the adjacent side of the engine. Formed through said plate is an opening 17 to accommodate a bolt 18 extending through the plate and through the portion 13 of the arm 12 connecting both the rack bar and the arm to the adjacent side bar of the vehicle chassis. Mounted upon the lower end portion of the pedal 10 is a pawl carrying clamp embodying companion clamping plates 19 bowed to embrace the pedal and provided at their rear ends with ears 20 while at their forward ends, the plates are extended to define spaced parallel arms 21. Interposed between said arms is a spacing block 22 through which are engaged rivets or other suitable fastening devices rigidly connecting the plates, and removably extending through the ears 20 of the plates is a bolt 23, the nut of which may be adjusted for binding the clamp upon the pedal. Pivoted between the forward ends of the arms 21 is a pawl 24 carried by a bolt 25 extending through the arms, the free end of the pawl being offset to cooperate with the rack bar 15. Mounted upon the pedal 10 above the pawl carrying clamp is a guide clamp which, as shown in Figure 3, is preferably formed from a single length of suitable resilient material bent to define a guide loop 26 from which extend spaced plates 27. Interposed between these plates is a spacing block 28 through which are engaged rivets or other suitable fastening devices rigidly connecting the plates at the rear of the loop while at the rear of the block the plates are bowed to embrace the pedal and are then bent to define companion ears 29. Extending through said ears is a bolt 30 the nut of which may be adjusted for binding the clamp upon the pedal. Formed through the plates 27 and through the block 28 is an opening 31 and engaged through said opening is a hook at one end of a spring 32. At its opposite end this spring is provided with a similar hook which, as shown in Figure 1, is engaged through a suitable opening in the pawl so that the spring will accordingly function to normally hold the free end of the pawl out of engagement with the rack bar. Slidable through the loop 26 of the guide clamp is a foot rod 33 provided at its lower end with a yoke 34 pivotally connected to the latch while at its upper end the rod is, as most clearly shown in Figure 2, offset, as indicated at 35, to extend upwardly at the right hand edge of the foot plate of the pedal, the offset 35 being engageable with the foot plate for limiting the latch 24 in its upward movement under the influence of the spring 32.

As will now be seen in view of the preceding description, the pedal 10 may, under ordinary circumstances, be freely rocked forwardly when, upon release of the pedal, the pedal will be returned in the customary manner. However, should it be desired to permit the vehicle to coast or to permit the engine to run without propelling the vehicle, the pedal may be shifted forwardly when, by depressing the foot rod 33, the pawl 24 may be engaged with the rack bar 15 for locking the pedal in neutral position. Similarly, when it is desired to proceed at low speed, the pedal may be rocked still further forwardly and the rod 33 depressed to shift the pawl into engagement with the rack bar locking the pedal for holding the low speed of the transmission active. Thus, as will be seen, the device will relieve the driver of the necessity for holding the clutch pedal in the desired position by the foot. To release the pawl, it will be only necessary to exert a slight forward pressure upon the clutch pedal when the spring 32 will function to elevate the pawl out of engagement with the rack bar, it being noted in connection with the rack bar that the toothed face thereof is, of course, curved on an arc having the axis of the pedal 10 as its center.

Having thus described the invention, what is claimed as new is:

1. A clutch pedal latch for motor vehicles including a rack bar for attachment to the vehicle in front of the pedal, a pivoted spring elevated pawl for connection to the pedal to cooperate with said bar, and a reciprocable foot rod connected with the pawl to extend adjacent the upper end of the pedal for engagement by the foot to depress the pawl into engagement with the bar locking the pedal when rocked forwardly and provided with means to engage the pedal for limiting the pawl in its upward movement.

2. A clutch pedal latch for motor vehicles including a rack bar having a laterally directed base plate apertured to accommodate a bolt connecting the plate with the vehicle, a clamp to embrace the pedal and provided with spaced arms, a pawl pivoted between said arms to cooperate with the bar, a second clamp to embrace the pedal and provided with a guide loop, a spring extending between the latter clamp and the pawl normally holding the pawl elevated out of engagement with the bar, and a reciprocable foot rod slidable through said loop and connected with the pawl, the rod being offset near its upper end to extend adjacent the foot plate of the pedal for engagement by the foot to depress the pawl into engagement with the bar locking the pedal when rocked forwardly and said offset in the rod being disposed to engage said foot plate for limiting the pawl in its upward movement.

In testimony whereof I affix my signature.

BURL WILLIAMS. [L. S.]